United States Patent [19]

Reuland et al.

[11] 4,249,544
[45] Feb. 10, 1981

[54] METHOD AND APPARATUS FOR GENERATING SIGNALS FOR ADJUSTMENT OF CIGARETTE ROD MAKING MACHINES OR THE LIKE

[75] Inventors: Joachim Reuland, Neu-Börnsen; Herbert Hinze; Lutz Reitmeier, both of Hamburg, all of Fed. Rep. of Germany

[73] Assignee: Hauni-Werke Körber & Co. KG, Hamburg, Fed. Rep. of Germany

[21] Appl. No.: 79,829

[22] Filed: Sep. 28, 1979

[30] Foreign Application Priority Data

Oct. 2, 1978 [DE] Fed. Rep. of Germany ....... 2842969

[51] Int. Cl.³ ............................................. A24B 5/38
[52] U.S. Cl. ................................. 131/21 B; 73/32 R; 328/1
[58] Field of Search ................. 131/21 B, 21 R, 21 C, 131/22 R; 73/32 R; 328/1

[56] References Cited

U.S. PATENT DOCUMENTS 3,878,982  4/1975  Hoffman .......................... 131/21 B
3,999,134 12/1976  Lorenzen ......................... 131/21 B

*Primary Examiner*—Stephen C. Pellegrino
*Attorney, Agent, or Firm*—Peter K. Kontler

[57] ABSTRACT

The wrapped cigarette rod which is formed in a cigarette making machine is monitored by a beta ray detector which generates first signals denoting the density of successive unit lengths of the moving rod. The first signals are compared with a reference signal which denotes the desired density of the rod, and the resulting third signals are squared, N squared signals are totalized and the resulting fourth signals are divided by signals denoting N - 1 first signals to form sixth signals. The square roots of sixth signals constitute regulating or adjusting signals which enable the attendants to feed tobacco or other fibrous material at an optimum rate. The regulating signals are converted into visible signals. The first signals can be used to adjust the position of the device which removes the surplus from a continuous tobacco stream to form a filler which is thereupon wrapped to constitute the cigarette rod.

10 Claims, 1 Drawing Figure

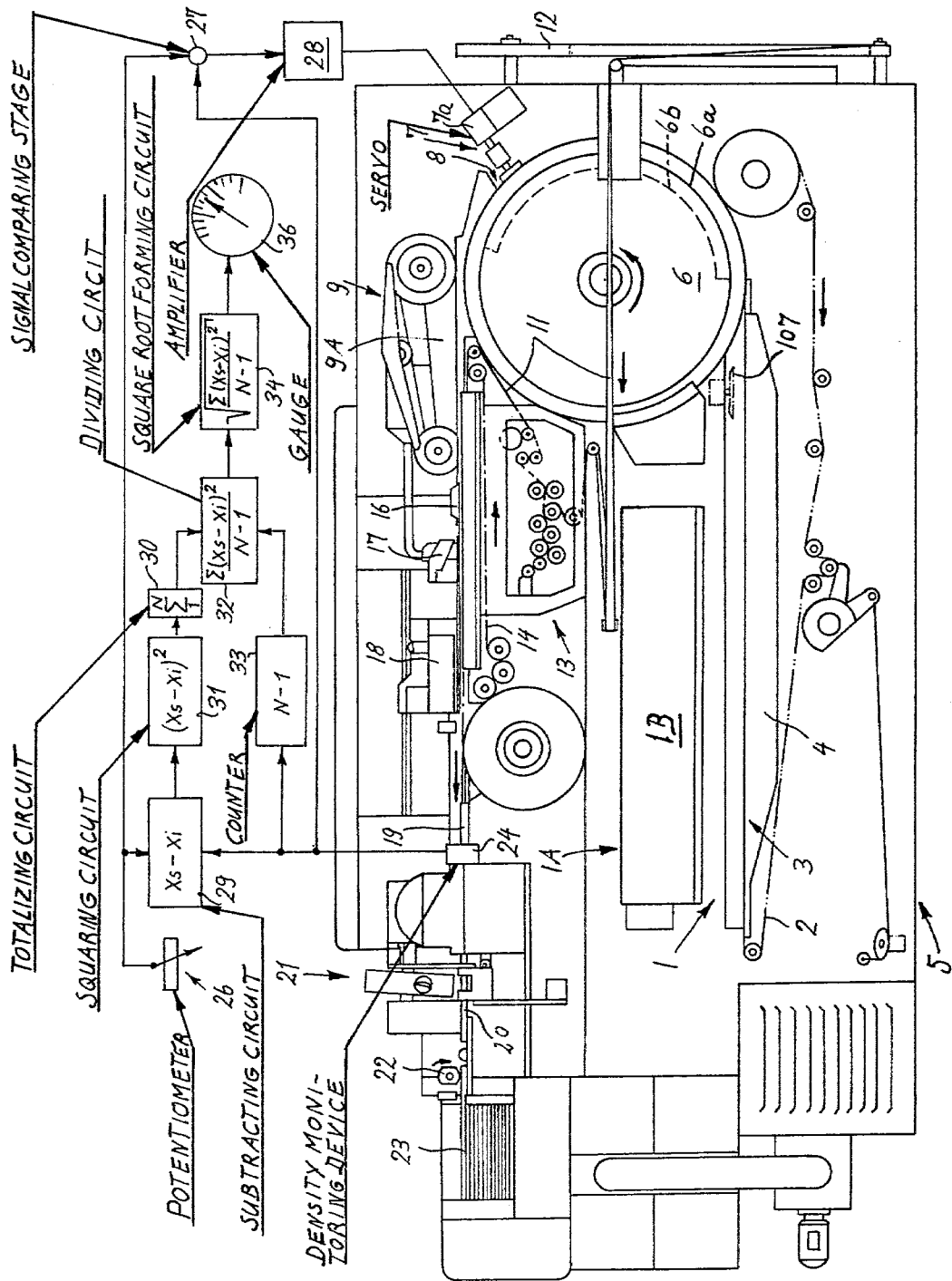

METHOD AND APPARATUS FOR GENERATING SIGNALS FOR ADJUSTMENT OF CIGARETTE ROD MAKING MACHINES OR THE LIKE

BACKGROUND OF THE INVENTION

The present invention relates to a method and apparatus for regulating or adjusting the operation of machines for the production of smokers' products. More particularly, the invention relates to improvements in a method and apparatus for regulating the operation of machines for the production of a continuous rod which can be subdivided into rod-shaped articles constituting or forming part of smokers' products. Such machines include those which manufacture plain cigarettes, cigars or cigarillos and filter rod sections. Still more particularly, the invention relates to a method and apparatus for processing signals which denote a selected characteristic (for example, density) of successive predetermined lengths of a moving rod of fibrous material in a machine of the above outlined character.

It is already known to monitor the rod which is formed in a cigarette making machine and is about to be subdivided into plain cigarettes of desired length. The monitoring step can involve ascertainment of density of successive unit lengths of the rod. The resulting measurement (density) signals are thereupon converted into signals which are useful to the attendants for appropriate adjustment of the machine in the event that the results of the monitoring operation indicate the need for adjustment. As a rule, signals which represent the density of unit lengths of the moving rod are converted into signals denoting the standard deviation (sigma) of the weights of cigarettes from a desired or optimum value. Such mode of monitoring the quality of the rod is not entirely satisfactory because all the attendants can ascertain is the statistical deviation of individual weights $X_i$ from the average weight $\overline{X}$ of a given group of N cigarettes. Thus, signals which denote the standard deviation (sigma) do not indicate the extent of deviation of the average weight of a group of cigarettes or the like from the desired average weight. Such deviation of average weight must be ascertained in addition to the aforediscussed determination of standard deviation. In order to be capable of evaluating the range of tolerances as well as the relationship of such tolerances to the desired weight of cigarettes or the like, the person in charge of a cigarette making or like machine should be in a position to consider both variables, namely, the standard deviation (sigma) and the deviation of average weight of a given group of cigarettes or the like from a desired or optimum average weight. This is particularly important in a modern cigarette maker or an analogous rod forming machine which operates satisfactorily when the weight of unit lengths of the rod matches or closely approximates a selected average or minimum acceptable value. A quality control which relies solely on two statistical values is not satisfactory.

OBJECTS AND SUMMARY OF THE INVENTION

An object of the invention is to provide a novel and improved method of generating signals which can be utilized for appropriate regulation of the operation of a machine for the manufacture of cigarettes or other rod-shaped articles constituting or forming part of smokers' products.

Another object of the invention is to provide a novel and improved method of processing signals which denote a selected characteristic of a continuous rod in a cigarette making or like machine.

A further object of the invention is to provide a method of generating regulating signals which are more useful to the attendants in charge of a cigarette making or like machine than the signals which denote or are a function of the standard deviation of a selected characteristic from the optimum value.

An additional object of the invention is to provide a novel and improved method of generating signals which enable the attendants in charge of a cigarette making or like machine to select an optimum rate of admission of starting material and/or to evaluate the condition of the machine in a novel, simple and time-saving manner.

A further object of the invention is to provide an apparatus for the practice of the above outlined method.

Another object of the invention is to provide an apparatus which can be installed or incorporated in existing machines for the manufacture of wrapped or unwrapped rods consisting of fibrous material such as natural, reconstituted or substitute tobacco or substances which form part of filters for tobacco smoke.

One feature of the invention resides in the provision of a method of forming regulating or adjusting signals in cigarette making or like machines wherein a continuous rod of fibrous material (such as natural, reconstituted or substitute tobacco or filter material) is conveyed lengthwise. The method comprises the steps of monitoring a characteristic (e.g., density) of the moving rod (or of discrete portions of the rod) and generating first signals which denote the characteristic of successive predetermined lengths of the rod (each such length can correspond to that of a unit length of a plain cigarette, cigar or cigarillo or filter rod section), comparing the first signals with a reference signal which denotes the desired or optimum characteristic of a predetermined length of the rod and generating third signals denoting the differences between the reference signal and successive first signals, squaring successive groups of N third signals and totalizing successive groups of N squared third signals to form fourth signals, generating fifth signals which correspond to the sums of N−1 first signals, dividing successive fourth signals with corresponding fifth signals to form sixth signals, and generating the regulating signals by forming square roots of successive sixth signals.

The method preferably further comprises the step of converting the regulating signals (i.e., the square roots of successive sixth signals) into readily detectable (e.g., visible) signals.

The monitoring step may include directing a beam of corpuscular radiation (e.g., beta rays) transversely across the moving rod and generating first signals as a function of the intensity of that portion of the beam which penetrates through successive predetermined lengths of the moving rod.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE of the drawing is a schematic front elevational view of a cigarette maker and of an apparatus which embodies one form of the invention.

DESCRIPTION OF THE PREFERRED EMBODIMENTS

The drawing illustrates a cigarette making machine of the type known as GARANT (produced by the assignee of the present application). The machine comprises a frame 5 for a distributor 1A (e.g., a distributor of the type disclosed in commonly owned U.S. Pat. No. 3,996,944 granted Dec. 14, 1976, to Alfred Hinzmann) whose belt conveyor 1B showers particles of tobacco into an elongated narrow channel 1 wherein the particles of tobacco descend onto the upper reach of a narrow tobacco stream forming belt conveyor 2. The upper reach of the conveyor 2 travels above the perforated bottom wall 3 of the channel 1, and such wall preferably constitutes the top wall of a stationary suctin chamber 4 which attracts the particles to the upper reach of the conveyor 2 so that the latter advances a growing tobacco stream in a direction to the right, as viewed in the drawing. The exposed upper side of the fully grown tobacco stream is trimmed by a first equalizing device 107 which is shown by phantom lines because it constitutes an optional component of the cigarette making machine. The once trimmed tobacco stream is thereupon transferred into the circumferential groove of a suction wheel 6 which transports the stream along an arc of approximately 180 degrees and past a second equalizing device 7 which removes the surplus from the exposed side of the tobacco stream in the groove of the wheel 6. The groove of the wheel 6 surrounds a perforated botom wall 6a which, in turn, surrounds an arcuate suction chamber 6b extending from the six o'clock to the twelve o'clock position and serving to insure that the particles of the tobacco stream in the groove are attracted by suction.

The equalizing device 7 converts the tobacco stream into a rod-like tobacco filler 8 which is withdrawn from the groove of the suction wheel 6 by the lower reach of an endless transfer conveyor 9. This conveyor preferably comprises an endless steel belt whose lower reach travels below the open underside of a stationary suction chamber 9a so that the filler 8 is compelled to leave the groove of the wheel 6 and is deposited at the upper side of a running web 11 of cigarette paper. The web 11 is drawn off a bobbin 12 by an endless belt conveyor 14 known as garniture and advances through an imprinting mechanism 13 which provides spaced-apart portions of the web with indicia denoting the name of the manufacturer, the trademark of the manufacturer, the name of the brand of cigarettes and/or other information. the garniture 14 advances the web 11 in a direction to the left, as viewed in the drawing, at the speed of the filler 8. The web 11 is partially draped around the filler 8 by a wrapping mechanism 16 so that one marginal portion of the web extends upwardly and is coated with adhesive by a paster 17. The one marginal portion is thereupon folded over the other marginal portion to form therewith a seam which extends lengthwise of the resulting continuous cigarette rod 19. The seam is heated or cooled by a plate-like sealer 18, depending upon whether the adhesive is a so-called wet adhesive or a hotmelt. The rod 19 is severed at regular intervals by a cutoff 21 to yield a succession of discrete plain cigarettes 20 which are propelled into successive flutes of a rotary drum-shaped row forming conveyor 23 by a rapidly rotating accelerator cam 22. The conveyor 23 forms one or two rows of plain cigarettes 20 which travel sideways and are transported into a filter tipping machine (e.g., a machine known as MAX S, manufactured by the assignee of the present application), to a packing machine or to storage.

The apparatus which embodies the present invention comprises a signal generating device 24 which monitors a characteristic (preferably density) of the moving rod 19 and transmits first signals $X_i$ which denote the selected characteristic (hereinafter called density) of successive cigarettes 20 (actually of successive portions of the rod 19, each such portion having a length corresponding to that of a plain cigarette). The signal generating device 24 may comprise a source of corpuscular radiation (e.g., beta ray) which directs a beam of corpuscular radiation from one side and transversely across successive predetermined lengths of the moving rod 19, and a transducer in the form of an ionization chamber which is installed at the other side of the rod 19 opposite the source and whose output transmits the signals $X_i$ to a signal comparing stage 27. Signals $X_i$ which are transmitted by the ionization chamber denote the density of successive cigarettes 20 of the file of cigarettes (which is formed by the cutoff 21. In other words, each signal $X_i$ is obtained by integration of a series of signals denoting the density of a series of successive unit lengths of the filler 8 in the rod 19, namely, of a series of unit lengths which together add up to the length of a plain cigarette 20. The manner in which such integration is carried out is known from the art of detectors which ascertain the density of tobacco fillers in plain cigarettes or like products.

The signal comparing stage 27 further receives a reference signal $X_s$ from a preferably adjustable potentiometer 26 or another suitable source. The signal $X_s$ denotes the desired or optimum density of the cigarettes 20. If the stage 27 ascertains that the signals $X_i$ deviate from the signal $X_s$, its output transmits a signal to an amplifier 28 which transmits an amplified signal to a servomotor 7a for adjustment of the equalizing device 7, namely, for adjustment of the distance between the rotating knife or knives of the equalizing device 7 and the bottom wall 6a in the circumferential groove of the suction wheel 6. In other words, the rate at which the equalizing device 7 removes the surplus from the tobacco stream in the groove of the wheel 6 to form the filler 8 is a function of differences between the signals $X_i$ and the signal $X_s$. The adjustment is such that the density of the filler 8 is changed if the device 24 ascertains that the monitored density deviates from a desired or optimum density (denoted by the signal $X_s$). The just described components of the improved apparatus insure that the density of the filler 8 in the rod 19 is constant or that any deviations of such density from an optimum value are eliminated with a minimum of delay.

The signals $X_i$ at the output of the ionization chamber of the signal generating device 24 are further transmitted to a first input of a differentiating circuit 29 which ascertains the difference between the reference signal $X_s$ and successively generated density signals $X_i$. It will be noted that the potentiometer 26 is connected with a second input of the differentiating circuit 29. The signals at the output of the differentiating circuit 29 denote the difference between the signals $X_s$ and $X_i$ and are transmitted to the input of a squaring circuit 31. The output of the squaring circuit 31 transmits signals which are indicative of $(X_s-X_i)^2$, and such signals are transmitted to the input of a totalizing circuit 30 which transmits signals denoting $$\sum_{1}^{N}(X_s-X_i)^2.$$

The output of the ionization chamber of the signal generating device 24 is further connected with a counter 33 which transmits signals denoting $N-1$ wherein N is a predetermined number of density signals $X_i$.

The signals at the outputs of the counter 33 and totalizing circuit 30 are transmitted to the corresponding inputs of a dividing circuit 32 whose output transmits signals denoting the quotient of signals from 30 and signals from 32, namely, $$\frac{\Sigma(X_s-X_i)^2}{N-1}.$$

Such quotient signals are transmitted to a square root forming circuit 34 whose output transmits signals $$\text{omega} = \sqrt{\frac{\Sigma(X_s-X_i)^2}{N-1}}.$$

The output of the circuit 34 is connected with a signal indicating device 36 here shown as a gauge whose scale is calibrated to illustrate the regulating or adjusting signals (omega) in a form which can be perused by attendants to effect appropriate adjustments of the cigarette making machine (if and when necessary). The signals omega can be used to regulate the admission of tobacco to the distributor 1A in such a way that the rate of tobacco consumption equals to approximates the optimum (preferably the most economical) rate.

The gauge 36 actually indicates the deviation of signals $X_i$ from the reference signal $X_s$. Such information is much more useful to the attendant or attendants than those indications which merely represent standard deviations of density and/or other characteristics of the filler 8.

The reference signals can be obtained by appropriate processing of (first) signals $X_i$ each of which denotes the density of a discrete cigarette 20. The number N then denotes the number of cigarettes 20 in a group of N cigarettes. However, it is equally possible to resort to suitable analog circuits which are capable of continuously generating signals denoting the momentary values of the signals $X_i$. By continuously comparing such signals $X_i$ with the reference signal $X_s$, one obtains a continuous series of (third) signals $X_s-X_i$ which are thereupon squared, totalized, divided by signals $N-1$ and processed in the circuit 34 to form regulating signals.

With appropriate programming, all of the aforediscussed functions of components 27, 29, 31, 32, 33 and 34 can be performed, for example, by resorting to a single board computer of the type ISBC 80/20 produced by Intel Corporation, California.

In certain instances, the counter 33 can be replaced with a circuit which transmits signals denoting the intensity or another characteristic of N (rather than $N-1$) signals. This is possible if the number (N) of cigarettes 20 is sufficiently high.

It is further within the purview of the invention to omit the circuit 34 and to provide an instrument for visual representation of signals at the output of the circuit 32. The provision of a gauge or another suitable indicating device is desirable and advantageous because this facilitates the task of the attendants, i.e., the attendants can carry out necessary adjustments while observing the pointer of the gauge 36. It goes without saying that the adjustments can be carried out automatically by resorting to servomotors or other suitable adjusting means which are responsive to signals from the circuit 32 and/or 34 and/or from the gauge 36. The amplifier 28 and servomotor 7a constitute a means for automatically regulating the removal of surplus from the tobacco stream as a function of deviation of density signals $X_i$ from the reference signal $X_s$.

The exact design of various totalizing, dividing, multiplying, square root forming and other circuits forms no part of the invention. Such circuits are available on the market and are used, for related or different purposes but always in different combinations with each other, in many types of machines for the manufacture and/or processing of smokers' products.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

We claim:

1. A method of forming regulating signals in cigarette making or like machines wherein a continuous rod of fibrous material is conveyed lengthwise, comprising the steps of monitoring a characteristic of the moving rod and generating first signals which denote said characteristic of predetermined lengths of the rod; comparing said first signals with a reference signal denoting the desired characteristic of said predetermined lengths and generating third signals denoting the difference between said first signals and said reference signal; squaring successive groups of N third signals and totalizing successive groups of N squared signals to form fourth signals; generating fifth signals corresponding to the sums of $N-1$ first signals; dividing successive fourth signals with corresponding fifth signals to form sixth signals; and generating said regulating signals, including forming square roots of successive sixth signals.

2. The method of claim 1, wherein said characteristic is the density of the rod.

3. The method of claim 1, further comprising the step of converting said regulating signals into detectable signals.

4. The method of claim 3, wherein said detectable signals are visible signals.

5. The method of claim 1, wherein said monitoring step includes directing a beam of corpuscular radiation transversely across the moving rod and generating said first signals as a function of the intensity of that portion of the beam which penetrates through successive predetermined lengths of the rod.

6. Apparatus for forming regulating signals in cigarette making or like machines wherein a continuous rod of fibrous material is conveyed lengthwise, comprising means for monitoring a characteristic of the moving rod, including means for generating first signals, denoting the characteristic of predetermined lengths of the rod; a source of reference signals denoting the desired characteristic of said predetermined lengths; means for comparing said first signals with said reference signals, including means for generating third signals denoting the differences between said reference signals and successive first signals; means for squaring the third signals; means for generating fourth signals, including means for totalizing successive groups of N squared third signals; means for generating fifth signals, including means for totalizing N−1 first signals; means for dividing successive fourth signals with successive fifth signals to form sixth signals; and means for generating said regulating signals, including means for forming square roots of successive sixth signals.

7. The apparatus of claim 6, wherein said monitoring means includes means for ascertaining the density of successive predetermined lengths of the moving rod.

8. The apparatus of claim 6, further comprising means for furnishing detectable indications of said regulating signals.

9. The apparatus of claim 8, wherein said means for furnishing detectable indications includes means for converting said regulating signals into visually detectable signals.

10. The apparatus of claim 6, wherein said monitoring means comprises a source of corpuscular radiation at one side of the moving rod and an ionization chamber at the other side of the moving rod opposite said source.

* * * * *